United States Patent [19]

Muscato et al.

[11] Patent Number: 5,421,085

[45] Date of Patent: Jun. 6, 1995

[54] EXTRUSION NOZZLE WITH ANNEALED END DAM

[75] Inventors: Mark Muscato; Charles H. Lipps, both of Yukon, Okla.

[73] Assignee: Xerox Corporation, Stamford, Conn.

[21] Appl. No.: 234,204

[22] Filed: Apr. 28, 1994

[51] Int. Cl.⁶ .......................... B23P 13/00; B41J 2/16; C22C 9/04

[52] U.S. Cl. .................................. 29/890.1; 29/557; 29/DIG. 26; 148/679

[58] Field of Search ........... 29/525.1, 557, 558, 29/DIG. 26, 890.1, 890.142; 427/356, 286; 148/679, 680, 684; 346/139 R

[56] References Cited

U.S. PATENT DOCUMENTS

| | | |
|---|---|---|
| 4,354,820 | 10/1982 | Yamamoto et al. ...... 29/DIG. 26 X |
| 4,373,895 | 2/1983 | Yamaoto et al. ................ 29/557 X |
| 4,486,934 | 12/1984 | Reed .............................. 29/558 X |
| 4,521,457 | 6/1985 | Russell et al. ..................... 427/286 |

Primary Examiner—Peter Vo

[57] ABSTRACT

A process is disclosed for fabricating an extrusion die including providing hard brass stock, machining the stock to form a thick rigid machined die end dam having a sharp corner, annealing the machined die end dam, providing a die body having at least one open end and an extrusion exit slot, and securing the machined end dam to the open end of the die to form an extrusion die assembly, the sharp corner being adjacent one end of the exit slot. This die assembly is employed to form a coating on a surface of a substrate by establishing relative motion between the surface of the substrate and the extrusion die assembly and extruding a ribbon-like stream of coating composition from the die through the extrusion exit slot onto the surface of the substrate to form a coating layer.

9 Claims, 5 Drawing Sheets

EXTRUSION NOZZLE WITH ANNEALED END DAM

BACKGROUND OF THE INVENTION

This invention relates to apparatus for applying to a surface of a support member at least one ribbon-like stream of a coating composition to form a unitary layer on the surface of the support member and processes for fabricating and using the apparatus.

Numerous techniques have been devised to form a layer of a coating composition on a substrate. One of these techniques involves the use of an extrusion die from which the coating composition is extruded onto the substrate. For fabrication of web type, flexible electrophotographic imaging members, the extrusion die must lay down very thin coatings meeting extremely precise, critical tolerances in the single or double digit micrometer ranges. Moreover, a plurality of dies may be needed to lay down up to three extruded coatings conventionally employed for flexible electrophotographic imaging members. The flexible electrophotographic imaging members may also comprise additional coatings applied by non-extrusion coating techniques so that the finished electrophotographic imaging member can contain as many as 5 different coatings. The extrusion die usually comprises spaced walls, each having a surface facing each other. These spaced walls form a narrow, elongated, passageway. Generally a coating composition is supplied by a reservoir to one side of the passageway and the coating composition travels through the passageway to an exit slot on the side of the passageway opposite the reservoir. Dams are provided at opposite ends of the passageway to confine the coating composition within the passageway as the coating travels from the reservoir to the exit slot. The surface of the dams facing the coating composition is generally perpendicular to the exit slot.

Each end dam seals one end of the die. These end dams have a sharp corner positioned at each end of the exit slot. This sharp corner is formed at the intersection of two adjacent sides of the end dam and is important to the proper operation of the coating process. More specifically, the extruded coating material pins to the sharp corner as the material emerges from the exit slot thereby creating a small, relatively flat edge bead for the deposited coated layer. The expression "pin" as employed herein is defined as the attachment of the coating composition to the extrusion die or end dam. Soft Teflon ® type materials have been used for extrusion die end dams. Teflon ® extrusion die end dams have excellent sealing attributes and resistance to the chemicals utilized for fabricating electrophotographic imaging members. However, Teflon ® also cannot be machined and the edge radius cannot be accurately controlled. Teflon ® extrusion die end dams require time to stabilize when coming on line immediately after installation thereby creating unacceptable coated material that must be scrapped. Moreover, with use, the sharp corner of Teflon ® extrusion die end dams deteriorates due to dents and cuts caused by cleaning operations and shimming of the die lip opening during coating runs. Dents and cuts can occur during the cleaning operation due to collisions with thin metal or plastic material which inserted through the die exit slot and slid back along the die passageway. As this corner breaks down, the extruded coating materials loses its ability to pin to the corner leading to edge bead instability which in turn creates a thicker and wider edge bead due to the necking in and movement of the coating material back on the radius of the corner. When sequentially applied layers having these thicker and wider edge beads are deposited over each other the resulting consolidated edge bead can become substantial due to edge bead build up. This edge bead build up causes a ridge to form above the overlapped edge beads as well as in the substrate below the overlapped edge beads when the coated support member is a flexible electrophotographic imaging web which is subsequently rolled for storage, shipment or for further processing. This ridge is undesirable in precision machines and can cause adverse effects such as electrical arcing and coating damage due to contact with closely spaced machine components. Moreover, edge bead build up tends to promote the formation of blisters when the coatings are applied as solutions containing volatile carrier liquids. Unduly thick and wide edge beads also present coating problems for subsequently applied layers and introduce handling and fabricating problems later in the manufacturing process. Also, production line down time is high because the Teflon ® extrusion die end dams must be replaced frequently. Substitution of ordinary brass end dams for Teflon ® extrusion die end dams results in leakage of the coating material from the ends of the extrusion dies. Aluminum end dams form particulates which contaminate the coating composition which in turn forms electrophotographically unacceptable layers. Stainless steel end dams do not seal well and leak. Many plastic end dam materials are dissolved by the solvents employed in the extruded coating compositions. Further, the extruded coating compositions will not pin to many end dam materials thereby causing the formation of unstable edge beads. Thus the characteristics of common extrusion systems utilizing end dams exhibit deficiencies for processes for manufacturing coated articles having precise tolerance requirements.

INFORMATION DISCLOSURE STATEMENT

U.S. Pat. No. 4,521,457 to Russell et al., issued Jun. 4, 1985—A process is disclosed herein at least one ribbon-like stream of a first coating composition adjacent to and in edge contact with at least one second ribbon-like stream of a second coating composition are deposited on the surface of a support member by establishing relative motion between the surface of the support member and the ribbon-like streams, simultaneously constraining and forming the ribbon-like streams parallel to and closely spaced from each other, contacting adjacent edges of the ribbon-like streams prior to applying the ribbon-like streams to the surface of the support member and thereafter applying the ribbon-like streams to the surface of the support member. A thin spacing member having a thickness of less than about 100 micrometers is employed to separate the two coating compositions.

SUMMARY OF THE INVENTION

It is an object of the invention to provide a process for fabricating an extrusion die comprising providing hard brass stock, machining the stock to form a thick rigid machined die end dam having a sharp corner, annealing the machined die end dam, providing a die body having at least one open end and an extrusion exit slot, and securing the machined end dam to the open end of the die to form an extrusion die assembly, the sharp corner being adjacent one end of the exit slot. This die assembly is employed to form a coating on a surface of a substrate by establishing relative motion between the surface of the substrate and the extrusion die assembly and extruding a ribbon-like stream of coating composition from the die through the extrusion exit slot onto the surface of the substrate to form a coating layer. Because of the relative movement between the die assembly and the surface of the substrate, the ribbon-like stream of coating material extends in the direction of relative movement of the surface of the substrate and the source of the ribbon-like stream of coating material to form a continuous coating layer having a relatively flat edge bead. Since the continuous coating layer has a small edge bead, coated flexible substrates may be rolled without attendant problems caused by beads at the boundaries. Further, because of the edge beads are smaller and flatter, the built up edge bead formed by the deposition of multiple coatings has a correspondingly small edge bead. Thus, the coatings of this invention are particularly useful for electrical applications such as adhesive layers, charge generating layers and charge transport layers for electrostatographic photoreceptors utilizing multiple layers. In addition, precise control of the dimensions of the deposited coatings may be achieved.

Obviously, this process may be employed to coat the surface of support members of various configurations including webs, sheets, plates, drums, and the like. The support member may be flexible, rigid, uncoated, precoated, as desired. The support members may comprise a single layer or be made up of multiple layers. Also, the coating compositions applied to the support member may comprise molten thermoplastic materials, solutions of film forming materials, curable resins and rubbers, and the like.

BRIEF DESCRIPTION OF THE DRAWINGS

A more complete understanding of the process and apparatus of the present invention can be obtained by reference to the accompanying drawings wherein.

The figures are merely schematic illustrations of the prior art and the present invention. They are not intended to indicate the relative size and dimensions of exxtrusion dies or components thereof.

DESCRIPTION OF THE PREFERRED EMBODIMENTS

Figure 1:
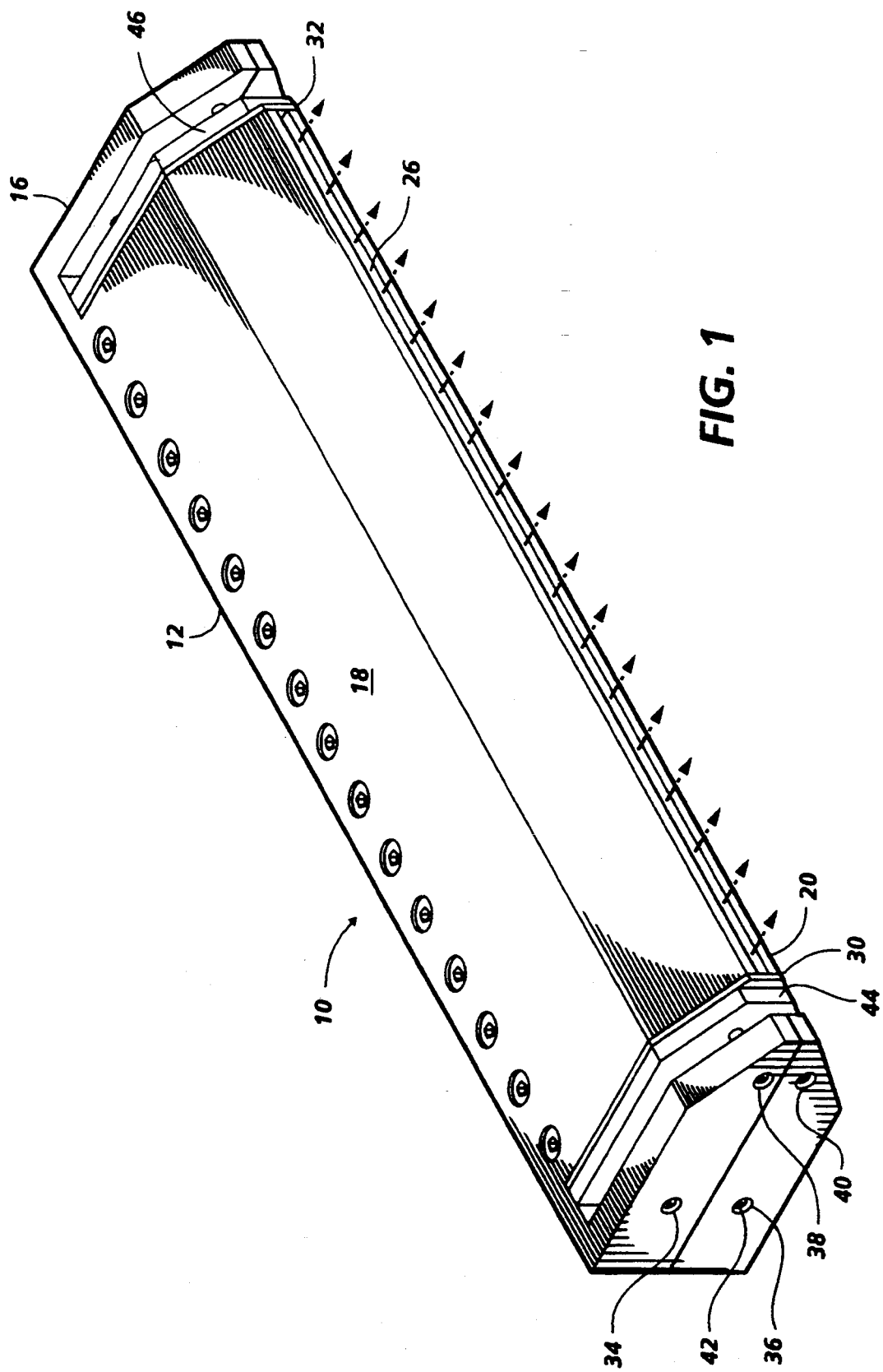
FIG. 1 is a schematic, isometric, sectional view showing an extrusion die comprising a die body fitted with end dams.
Figure 2:
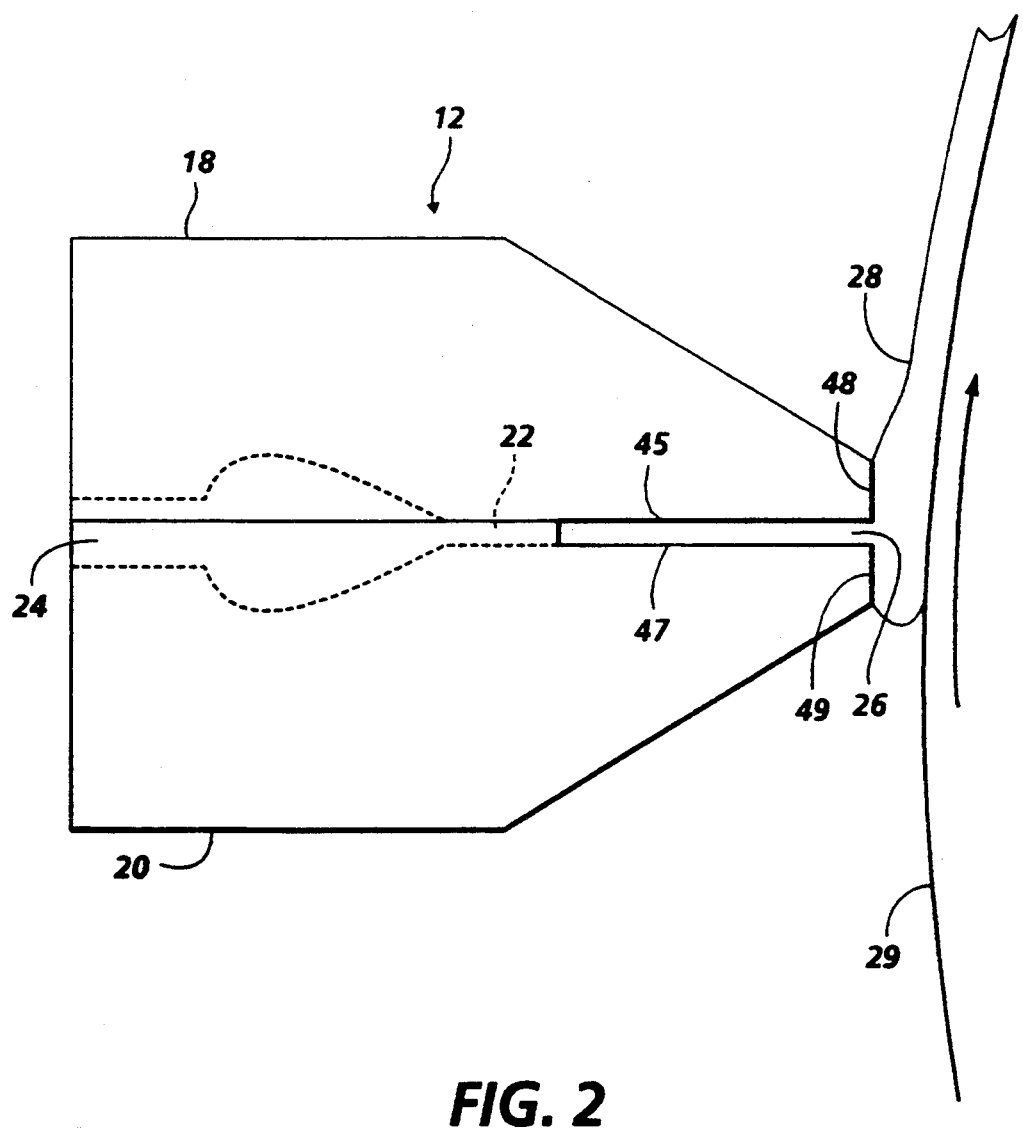
FIG. 2 is a schematic, sectional end view of a die body from which a ribbon-like stream of a coating composition is extruded.

Referring to FIGS. 1 and 2, a die assembly designated by the numeral 10 is illustrated. Extrusion dies are utilized for extrusion of coating compositions onto a support. Extrusion dies are well know and described, for example, in U.S. Pat. No. 3,920,862 and U.S. Pat. No. 4,521,457, the entire disclosures thereof being incorporated herein by reference. Die assembly 10 comprises a die body 12 equipped with clamping flanges 13, 14, 15 and 16. Die body 12 comprises and upper lip 18 and lower lip 20 which are spaced apart to form a flat narrow passageway 22 (see FIG. 2) which leads from inlet 24 to exit slot 26 through which a coating composition 28 is extruded as a ribbon-like stream in the direction shown by the arrows (see FIG. 1) onto substrate 29 (see FIG. 2) moving in the direction shown by the arrow. The width, thickness, and the like of the ribbon-like stream can be varied in accordance with factors such as the viscosity of the coating composition, thickness of the coating desired, and width of the substrate 29 on which the coating composition is applied, and the like. End dams 30 and 32 (see FIG. 1) are secured to the ends of upper lip 18 and lower lip 20 of die body 12 to confine coating composition 28 within passageway 22 as coating composition 28 travels from inlet 24 to exit slot 24. The length of passageway 22 should be sufficiently long also ensure laminar flow. Control of the distance of exit slot 26 from substrate 29 enables coating composition 28 to bridge the gap between each exit slot 26 and substrate 29 depending upon the viscosity and rate of flow of coating composition 28 and the relative rate movement between die assembly 10 and substrate 29. Generally, it is preferred to position the narrow extrusion slot outlet for lower viscosity ribbon-like streams closer to the support surface than the narrow extrusion slot outlet for higher viscosity ribbon-like streams to form a bead of coating material which functions as a reservoir for greater control of coating deposition. As conventional in the art, coating composition 28 is supplied from a reservoir (not shown) under pressure using a conventional pump or other suitable well known means such as a gas pressure system (not shown). Clamping flanges 14 and 16 contain threaded holes 34, 36, 38 and 40 into which set screws 42 are screwed to secure end dams 30 and 32 between backing plates 44 and 46, respectively, and the adjacent ends of upper lip 18 and lower lip 20 of die body 12. Any suitable means such as screws 43 or the like, such as bolts, studs, or clamps (not shown), may be utilized to fasten upper lip 18 and lower lip 20 together. Inner lip surfaces 45 and 47 (see FIG. 2) of upper lip 18 and lower lip 20, respectively, are precision ground to ensure accurate control of the deposited coating thickness and uniformity. Under stable conditions, the extruded coating materials pins or clings to the outer lip surfaces 48 and 49 of upper lip 18 and lower lip 20, respectively. Outer lip surfaces 48 and 49 may be of any suitable configuration including squared, knife and the like. A flat squared end is preferred for the coating embodiment illustrated. The flat outer lip surfaces 48 and 49 appear to further support and stabilize the beads during bead coating operations.

Figure 3:
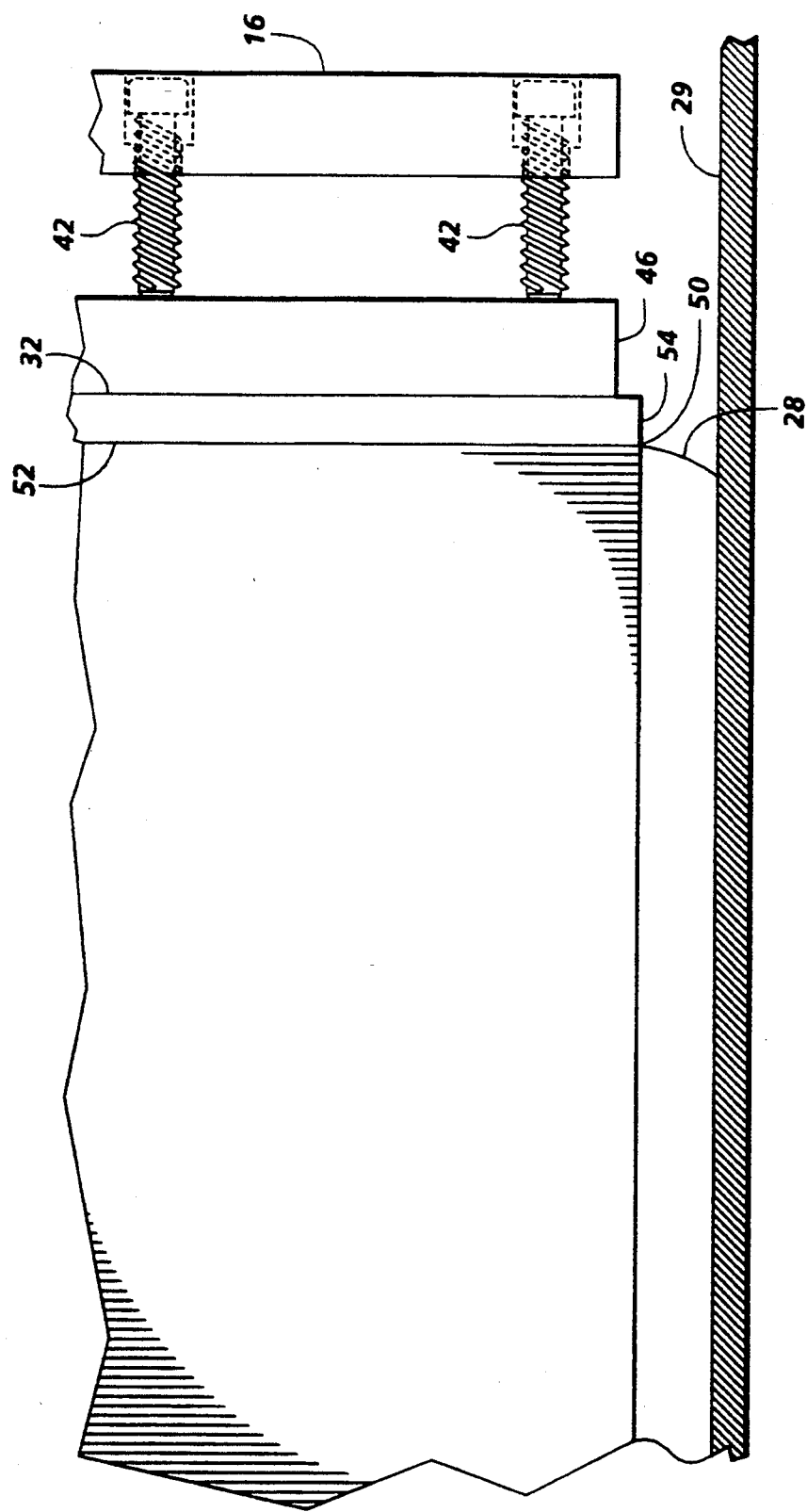
FIG. 3 is a schematic, sectional side view of a die body of this invention from which a ribbon-like stream of a coating composition is extruded.

In FIG. 3, an enlarged sectional view is shown of part of the die assembly 12 illustrated in FIGS. 1 and 2. End dam 32 has a sharp corner 50 formed at the intersection of two adjacent perpendicular sides 52 and 54 of the end dam 32. Sharp corner 50 of end dam 32 is located at one end of exit slot 26. When sharp corner 50 has a radius of curvature of less than about 400 micrometers, the extruded coating material 28 pins or clings to the sharp corner 50 as the material emerges from exit slot 26 resulting stable coating conditions and the formation of a small, relatively flat edge bead in the deposited coated layer.

Figure 4:
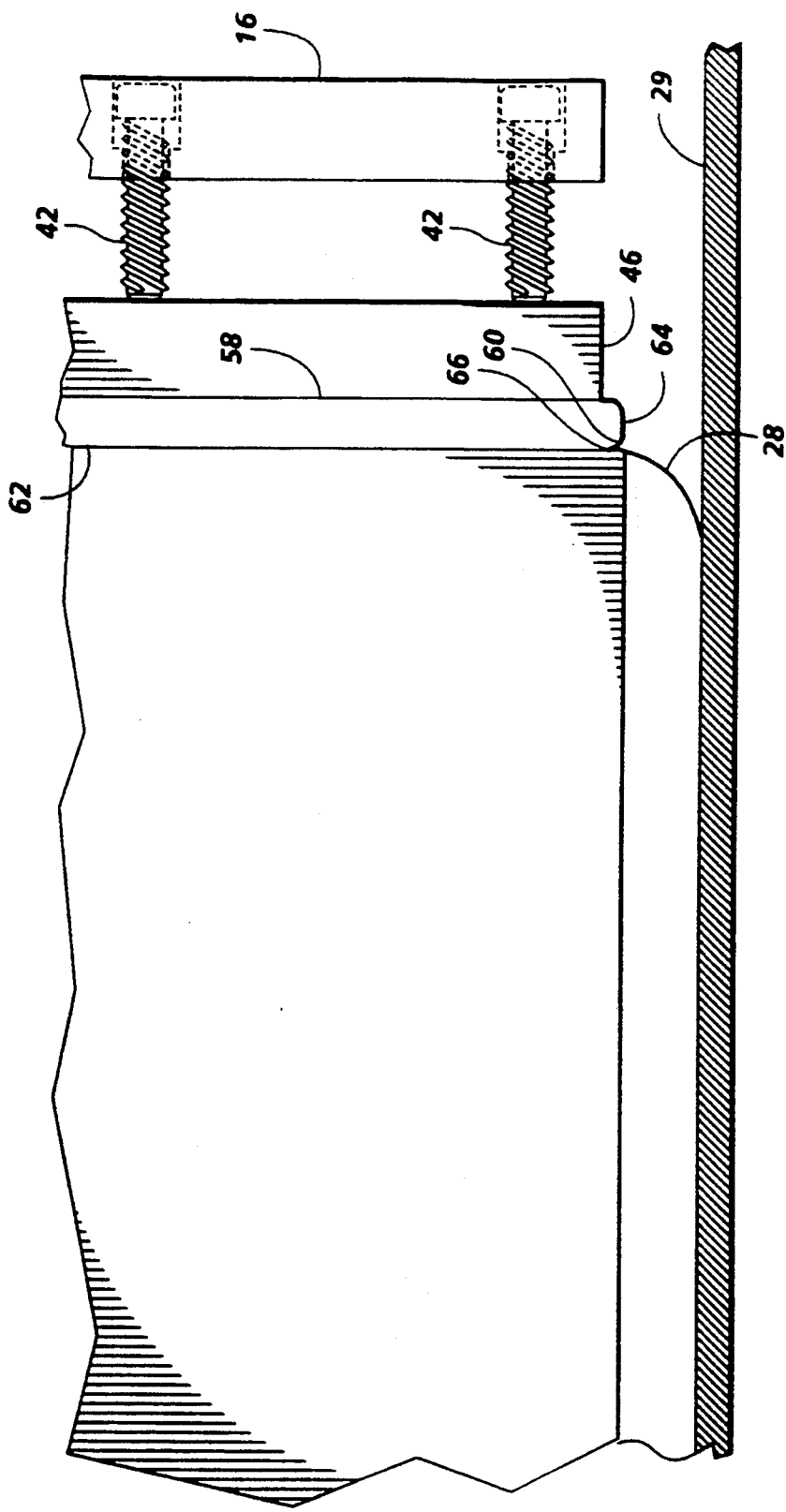
FIG. 4 is a schematic, sectional side view of an undesirable die body from which a ribbon-like stream of a coating composition is extruded.

Illustrated in FIG. 4, is an enlarged sectional view of part of a die assembly similar to die assembly 12 illustrated in FIGS. 1 and 2. End dam 58 has a rounded corner 60 formed at the intersection of two adjacent perpendicular sides 62 and 64 of end dam 58. Rounded corner 60 of end dam 58 is located at one end of exit slot 26. The rounded shape may be due to the manner in dam 58 originally fabricated or due to damage during handling, cleaning or use. When rounded corner 60 has a radius of curvature of greater than about 400 micrometers, the extruded coating material 18 causes coating instability and the edge bead of the deposited coating 18 becomes wide and thicker because coating material 28 moves back and forth along the curved surface of rounded corner 60 and tends to neck and pin to the inner base of the curved surface of rounded corner 60 at location 66 where the coating material must span a larger gap. Thus, rounded corner 60 has a very adverse effect on deposited coatings, particularly when formed on webs which are further processed, e.g. wound into rolls, coated with additional materials and the like.

Figure 5:
FIG. 5 is a schematic, sectional view of a deposited extruded single coating layer having an edge bead.

In FIG. 5, an enlarged sectional view is shown of substrate 29 coated with a coating composition 28 having an edge bead 68 formed with an extrusion die assembly containing an end dam having a shape similar to the shape of end dam 64 illustrated in FIG. 4. The rounded corner 60 of end dam 64 presents a poor pinning surface which causes this edge bead 68 to be wide and tall due to coating instabilities. A smaller and flatter edge bead is more desirable.

Figure 6:
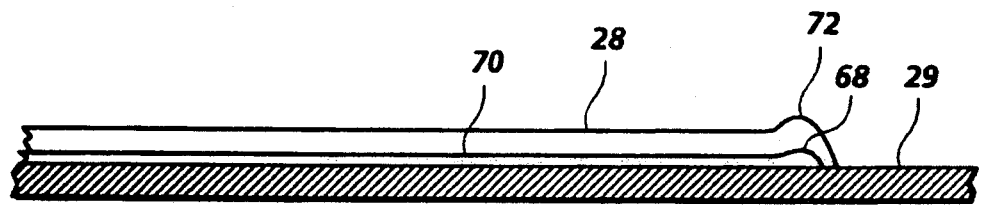
FIG. 6 is a schematic, sectional view of two deposited extruded coating layers, the combination forming a large edge bead.

Shown in FIG. 6 is an enlarged sectional view is shown of substrate 29 coated with a coating composition 28 having an edge bead 68 described with reference to FIG. 5 above, but bearing a second extruded coating 70 and edge bead 72 formed with another extrusion die assembly containing an end dam having a shape similar to the shape of end dam 64 depicted in FIG. 4. As each coated layer is applied on top of each other, the edge bead build up can become even more extreme thereby causing coating and material handling problems, if the edge bead build up is not minimized.

Any suitable rigid material may be utilized for the main die body. Typical rigid materials include, for example, stainless steel, chrome plated steel, ceramics, or any other metal or plastic capable of maintaining precise machining tolerances. Stainless steel and plated steel having a nickel plated intermediate coating and a chrome plated outer coating are preferred because of their long wear characteristics and capability of maintaining precise machining tolerances. The main die body may comprise separate top and bottom sections. To achieve the extremely precise coating thickness profiles and exceptional surface quality requirements desired for electrophotgraphic imaging member coatings, the finish grinding of the die should be accomplished consistently under high tolerance constraints across the entire die width, e.g. widths as high as 102 cm (40 inches). A preferred way to achieve such precision is to continue to move a die grinding wheel beyond the die body at the end of each grinding pass, i.e. the grinding wheel should not stop or slow down at any point while in contact with the die body. Thus, for dies that can meet exacting coating requirements, the use of separate end dams are necessary to seal both ends of the die body.

Any suitable machinable and annealable brass stock material may be used for the brass end dams of this invention. Typical brass stock compositions comprise between about 58 percent and about 85 percent by weight copper and between about 15 percent and about 42 percent by weight zinc, based on the total weight of the brass stock. Preferably, the brass stock comprises between about 60 percent and about 65 percent by weight copper, between about 33 percent and about 38 percent by weight zinc, between about 0.5 percent and about 3.5 percent by weight lead, and less than about 0.5 percent by weight iron based on the total weight of the brass stock. For the machining step of the invention, the brass stock is a hard brass which preferably has a tensile strength of between about 70,000 psi and about 80,000 psi. For satisfactory results, the brass end dam should be a soft or ½ hard brass after the annealing step and have a tensile strength of between about 40,000 psi and about 55,000 psi. Brass end dams having a tensile strength outside this range tend to leak. Preferably, the tensile strength of the soft brass end dam after the annealing step is between about 45,000 psi and about 50,000 psi. A preferred hard brass stock for machining is a free-cutting brass such as CDA360 from Progressive Brass in Tulsa, Okla.

Any suitable and conventional technique may be utilized to machine the brass stock material to form the brass end dams of this invention. Typical machining techniques include, for example, milling, grinding, die cutting, and the like. Preferably, the end dams are machined to achieve the desired shape by using a programmable end mill operated at high spindle speeds to form a good surface finish on the dam edges. The brass stock is preferably supported with a suitable fixture while machining to prevent distortion and bending.

The machined die end dam should be rigid and have a thickness of at least about 800 micrometers. Preferably, the thickness is between about 800 micrometers and about 3200 micrometers. Optimum results are achieved with a thickness of about 1500 micrometers. A machined end dam thickness of less than about 800 micrometers thick is very difficult to machine without distortion, can encounter warpage during the annealing process, and which can deform under the pressures applied during coating extrusion. Excellent results are achieved a machined end dam thickness of about 1500 micrometers. Machined end dams having a thickness greater than about 3200 micrometers can be used, but would be more expensive and would offer no advantages over thinner material.

As described above, machined end dam of this invention is secured to at least one open end of the die body, the sharp corner being adjacent one end of the exit slot of the die body. This sharp corner is formed at the intersection of two adjacent sides of the end dam and is important to the proper operation of the coating process. The adjacent, intersecting sides of the die are preferably positioned at an angle with each other between about 94 degrees and about 86 degrees. Since the exit slot of the die is normally positioned only about 150 micrometers to 230 micrometers from the electrophotographic imaging member substrate during coating, an angle greater about 94 degrees can cause the machined end dam to strike and damage the substrate. In other words, the corner angle should be less than about 94 degrees to provide sufficient clearance with the substrate being coated. A corner angle of less than about 86 degrees is more difficult to machine and is less resistant to damage when struck by cleaning devices. Optimum results are achieved with a corner angle of about 90 degrees. Also, by machining the corner angle on each side of the end dam to 90 degrees, the machined end dam can be interchangeably used at either end of the die body. Further, a 90 degree angle is easier to machine. For satisfactory results, the extreme edge of the sharp corner has a radius of curvature of less than about 800 micrometers. Preferably, the extreme edge of the sharp corner preferably has a radius of curvature of less than about 400 micrometers to ensure that the coating material consistently pins to the interior side of the end dam during extrusion thereby forming the flattest possible edge bead in the deposited coating. When the radius of curvature of the sharp corner is greater than about 400 micrometers, the likelihood of the extruded coating material breaking away from the corner begins to increase and the resulting coating bead becomes more and more unstable.

After the machining of the end dams is completed, the end dam must be annealed. Any suitable annealing technique may be used. Annealing involves slowly heating of the machined end dam followed by gradual cooling. Any suitable heating means may be employed to heat the end dam after machining. Typical heating means include, for example, an oven, a torch, and the like. Generally, heat is evenly applied until the brass end dam changes to a brownish color. Overheating of the brass end dam beyond the point where the brownish discoloration occurs will also result in an end dam that too soft. Heating may be effected while the end dam rests on a support comprising a large mass of thermally conductive material such as steel, cast iron, and the like. After the brass changes from a brass or gold color to a brownish color during the heating step, the end dam is cooled gradually. Rapid cooling can adversely affect the final hardness properties of the end dam. For example, cooling in ambient air after removal of the end dam from a support comprising a large mass of thermally conductive material results in an end plate that remains too hard. Thus, when cooling in ambient air, the rate of cooling may be suitably reduced by keeping the end dam in contact with the support of thermally conductive material used during the heating step. The rate of cooling can be regulated by any other suitable means such as a oven controlled by an automatic thermostat. If the the end dam is quenched in water to cool, the brass material becomes too soft. In a suitable typical annealing process, the end dam is heated slowly and evenly with a torch while the end dam is supported on a flat steel plate. Heat is applied until the brass end plate changes to a brownish color. The heat source is then removed and the end plate is allowed to cool in ambient air while the end plate remains supported by the steel plate. The annealing process should be sufficient to provide a brass that is ductile enough to seal the sides of the die, yet be tough enough to resist damage during cleaning and shimming of the die. Generally, after annealing, the brass end dam has a a tensile strength between about 40,000 psi and about 55,000 psi. After the end dam annealing process is completed, the sharp corner of the end dam is preferably deburred. Deburring may be accomplished by any suitable technique, e.g. by hand using 30 micrometer polishing paper on a surface plate. This removes any machining burrs and leaves a maximum radius of curvature on the sharp corner of less than about 400 micrometers. A suitable polishing paper is the type of paper used by the computer industry for preparing computer hard drive disks. The annealed brass material for the end dams of this invention are resistant to the chemicals used during extrusion coating and provide excellent sealing of the ends of the dies. Moreover, the annealed dams exhibit much longer end dam life provide improved coatings. The machined sharp corner creates a very good point for the extruded material to pin to. This arrangement creates a thin, flat, crisp edge bead that is very desirable for electrophotographic imaging member coating layers. Further, dies with the end dam of this invention can be brought on line easier and more rapidly because the extruded coatings stabilized much faster than with the Teflon ® end dams thereby creating less scrap and waste. In addition, less die maintenance is required.

The annealed brass end dam of this invention is fastened to at least one end of the the die body by any suitable fastening means. Examples of fastening means include, machine screws inserted through holes in the end dam and screwed into threaded holes in the die body; threaded studs mounted in threaded holes in the die body and extending through holes in the end dam to receive nuts; set screws screwed into threaded holes in frame members or die body clamping flanges to press and clamp the end dam against an end of the die body; and the like.

Any suitable coating composition may applied to a substrate with the extrusion die of this invention. Generally, the coating composition comprises a film forming polymer and a liquid carrier for the film forming polymer. The liquid carrier may be a solvent which dissolves the film forming polymer or a non-solvent in which the film forming polymer is dispersed or emulsified. Any suitable film forming polymer may be used. Typical film forming polymers include, for example, polycarbonates, polyesters, and the like. Typical solvents or liquid carriers include, for example, methylene chloride, tetrahydrofuran, toluene, methyl ethyl ketone, isopropanol, methanol, cyclohexanone, heptane, other chlorinated solvents, water, and the like. Water is an example of a common non-solvent liquid carrier. The compositions of layers normally extruded onto substrates during the fabrication of electrophotographic imaging members are well known in the art and described in the patent literature. These layers include, for example, adhesive layers, charge generating layers, charge transport layers, anticurl backing layers, and the like.

The selection of the narrow die passageway and exit slot height generally depends upon factors such as the fluid viscosity, flow rate, distance to the surface of the support member, relative movement between the die and the substrate and the thickness of the coating desired. Generally, satisfactory results may be achieved with narrow passageway and exit slot heights between about 25 micrometers and about 750 micrometers. It is believed, however, that heights greater than 750 micrometers will also provide satisfactory results. Good coating results have been achieved with slot heights between about 100 micrometers and about 250 micrometers. Optimum control of coating uniformity and edge to edge contact are achieved with slot heights between about 150 micrometers and about 200 micrometers. The roof, sides and floor of the narrow die passageway should preferably be parallel and smooth to ensure achievement of laminar flow. The length of the narrow extrusion slot from the entrance opening to the outlet opening should be at least as long as the spacing member to ensure achievement of laminar flow.

The gap distance between the die outer lip surface adjacent the exit slot and the surface of the substrate to be coated depends upon variables such as viscosity of the coating material, the velocity of the coating material and the angle of the narrow extrusion passageway relative to the surface of the support member. Generally speaking, a smaller gap is desirable for lower flow rates. Regardless of the technique employed, the flow rate and distance should be regulated to avoid splashing, dripping, puddling of the coating material.

Relative speeds between the coating die and the surface of the substrate up to about 200 feet per minute have been tested. However, it is believed that greater relative speeds may be utilized if desired. The relative speed should be controlled in accordance with the flow velocity of the ribbon-like stream of coating material.

The flow velocities or flow rate per unit width of the narrow die passageway for the ribbon-like stream of coating material should be sufficient to fill the die to prevent dribbling and to bridge the gap as a continuous stream moves to the surface of the substrate. However, the flow velocity should not exceed the point where non-uniform coating thicknesses are obtained due to splashing or puddling of the coating composition. Varying the die to substrate surface distance and the relative die to support member surface speed will help compensate for high or low coating composition flow velocities.

The coating technique of this invention can accommodate an unexpectedly wide range of coating compositions viscosities from viscosities comparable to that of water to viscosities of molten waxes and molten thermoplastic resins. Generally, lower coating composition viscosities tend to form thinner wet coatings whereas coating compositions having high viscosities tend to form thicker wet coatings. Obviously, wet coating thickness will form thin dry coatings when the coating compositions employed are in the form of solutions, dispersions or emulsions.

The pressures utilized to extrude the coating compositions through the narrow die passageway depends upon the size of the passageway and viscosity of the coating composition.

Any suitable temperature may be employed in the coating deposition process. Generally, ambient temperatures are preferred for deposition of solution coatings. However, higher temperatures may be necessary for depositing coatings such as hot melt coatings.

A number of examples are set forth hereinbelow and are illustrative of different compositions and conditions that can be utilized in practicing the invention. All proportions are by weight unless otherwise specified. It will be apparent, however, that the invention can be practiced with many types of compositions and can have many different uses in accordance with the disclosure above and as pointed out hereinafter.

EXAMPLE I

A coating composition was prepared containing about 1.3 kilograms of a photoconductive pigment, about 3.1 kilograms of polycarbazole resin, and about 39.6 kilograms of toluene and tetrahydrofuran solvents. This composition had a viscosity of about 85 cp and was applied by means of an extrusion die assembly (similar to the die illustrated in FIGS. 1 and 2) to a metalized polyethylene terephthalate film coated with a polyester coating.

The extrusion die assembly utilized annealed brass end dams secured to each end of a die body. The annealed brass dams were prepared by machining free-cutting brass stock (CDA360, available from Progressive Brass in Tulsa, Okla.) having a tensile strength of about 70,000 psi to form a rigid end dam having a thickness of 1500 micrometers and a sharp corner formed at the intersection of two adjacent sides of each end dam. The adjacent, intersecting sides of the end dam were at 90 degrees to each other. The extreme edge of the sharp corner of each end dam had a radius of curvature of less than 400 micrometers. Each brass end dam was placed on a steel plate and slowly heated with an acetylene torch with a wide flame until the initial brass color changed to a brownish color. The torch was extinguished and the heated brass end dams were allowed to slowly cool while resting on the steel plate by exposure to ambient air temperature. After the end dam annealing process was completed, it is believed that the annealed end dam had a tensile strength of less than about 50,000 psi. The sharp corner of each end dam was deburred by hand using a 30 micrometer polishing paper on a surface plate. The polishing paper was of the type of paper used by the computer industry for preparing computer hard drive disks. The polishing step removed any machining burrs present but retained a sharp corner having a radius of curvature on the sharp corner of 300–400 micrometers.

The film was transported beneath the die assembly at about 21 meters per minute. The length, width, and height of the narrow extrusion passageway in the die was about 30 mm, 830 mm, and 200 micrometers respectively. The deposited coating was dried in a first zone at about 93° C. and thereafter dried in a second zone at about 143° C. The deposited dried coating was 828 millimeters wide and 1.6 micrometers thick with an edge bead about 700 micrometers wide and 3 micrometers thick.

EXAMPLE II

The procedures described in Example I were repeated except that a coating composition comprising about 4 kilograms of a co-polyester resin, about 4.02 kilograms of polycarbonate resin, and about 45.4 kilograms of methylene chloride solvent. This composition had a viscosity of about 600 cp and was applied to the coated film described in Example I by means of an extrusion die assembly similar to the die described in Example I, except that the length, width, and height of the narrow extrusion passageway in the die utilized to apply this second coating was about 30 millimeters, 850 millimeters, and 450 micrometers respectively. The deposited coating was dried in a first zone at about 49° C., dried in a second zone at about 55° C., and thereafter dried in a third zone at about 68° C. The deposited dried coating layer was 848 millimeter wide and 15.5 micrometers thick with an edge bead about 500 micrometers wide and 18 micrometers thick.

EXAMPLE III

The procedures described in Example I were repeated except that the die employed utilized Teflon end dams having a rounded corner formed at the intersection of two adjacent sides of each end dam. The rounded corner of each dam had a radius of curvature of 800 micrometers. The deposited dried coating layer was 824 millimeters wide and 1.6 micrometers thick with an edge bead about 2000 micrometers wide and 4 micrometers thick with bead position fluctuation.

EXAMPLE IV

The procedures described in Example III were repeated except that a coating composition comprising about 4 kilograms of a co-polyester resin, about 4.02 kilograms of polycarbonate resin, and about 45.4 kilograms of methylene chloride solvent. This composition had a viscosity of about 600 cp and was applied to the coated film described in Example I by means of an extrusion die assembly similar to the die described in Example III, except that the length, width, and height of the narrow extrusion passageway in the die utilized to apply this second coating was about 30 millimeter, 850 millimeters, and 450 micrometers respectively. The deposited coating was dried in a first zone at about 49° C., dried in a second zone at about 55° C., and thereafter dried in a third zone at about 68° C. The dry coating layer was 847 millimeters wide and 15.5 micrometers thick with an edge bead about 900 micrometers wide and 20 micrometers thick, but did not show bead position fluctuation.

EXAMPLE V

The procedures described in Example I were repeated except that the brass end dams were not annealed. The end dams leaked during an attempt to use the die assembly for extrusion coating.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for fabricating an extrusion die comprising: providing hard brass stock comprising between about 58 percent and about 85 percent by weight copper and between about 15 percent and about 42 percent by weight zinc, based on the total weight of said brass stock, machining said stock to form a thick rigid machined die end dam having a sharp corner, annealing said machined die end dam, providing a die body having at least one open end and an extrusion exit slot, and securing said machined end dam to said at least one open end of said die body, thereby producing the extrusion die having said die end dam having said sharp corner adjacent one end of said exit slot.

2. A process according to claim 1 wherein said sharp corner has a radius of curvature of less than about 400 micrometers.

3. A process according to claim 1 wherein said sharp corner is formed by the intersection of two adjacent sides of said end dam, said sides positioned at an angle with each other between about 94 degrees and about 86 degrees.

4. A process according to claim 1 wherein said die body comprises a material selected from the group consisting of stainless steel and plated steel having a nickel plated intermediate coating and a chrome plated outer coating.

5. A process according to claim 1 wherein said annealing of said machined die end dam comprises slowly heating said machined die end dam until said machined die end dam changes to a brownish color and slowly cooling said machined die end dam.

6. A process according to claim 5 wherein said machined die end dam is slowly cooled in ambient air.

7. A process according to claim 1 wherein said machined die end dam has a thickness of at least about 800 micrometers.

8. A process according to claim 1 wherein said brass stock comprises between about 60 percent and about 65 percent by weight copper, between about 33 percent and about 38 percent by weight zinc, between about 0.5 percent and about 3.5 percent by weight lead, and less than about 0.5 percent by weight iron based on the total weight of said brass stock.

9. A process according to claim 1 wherein said brass stock has a tensile strength of between about 70,000 psi and about 80,000 psi and said end dam has a tensile strength of between about 40,000 psi and about 55,000 psi after said annealing step.

* * * * *